(12) United States Patent
Nielsen et al.

(10) Patent No.: US 11,671,753 B2
(45) Date of Patent: Jun. 6, 2023

(54) OPTIMIZATION OF MULTI-MICROPHONE SYSTEM FOR ENDPOINT DEVICE

(71) Applicant: Cisco Technology, Inc., San Jose, CA (US)

(72) Inventors: Johan Ludvig Nielsen, Sør-Fron (NO); Patrick Ryan Tompion Achtelik, Oslo (NO); Per Arild Kahrs Dykesteen, Oslo (NO); Ragnvald Balch Barth, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/459,876

(22) Filed: Aug. 27, 2021

(65) Prior Publication Data

US 2023/0063260 A1   Mar. 2, 2023

(51) Int. Cl.
*H04R 1/40* (2006.01)
*G10L 25/84* (2013.01)

(52) U.S. Cl.
CPC .............. *H04R 1/406* (2013.01); *G10L 25/84* (2013.01)

(58) Field of Classification Search
CPC ................................ H04R 1/406; G10L 25/84
USPC ......................... 381/56, 58, 91, 92, 333, 388
See application file for complete search history.

(56) References Cited

U.S. PATENT DOCUMENTS

| | | | |
|---|---|---|---|
| 9,113,243 B2 | 8/2015 | Nielsen et al. | |
| 9,210,499 B2 | 12/2015 | Sun et al. | |
| 9,226,062 B2 | 12/2015 | Sun et al. | |
| 9,571,925 B1* | 2/2017 | Adva Fish | H04R 3/005 |
| 9,723,401 B2 | 8/2017 | Chen et al. | |
| 10,051,396 B2 | 8/2018 | Virolainen et al. | |
| 10,389,885 B2 | 8/2019 | Sun et al. | |
| 10,863,035 B2 | 12/2020 | Robison et al. | |
| 10,992,905 B1 | 4/2021 | Therkelsen et al. | |
| 11,011,182 B2 | 5/2021 | Shanmugam et al. | |
| 11,076,251 B2 | 7/2021 | Burenius | |
| 2013/0216050 A1* | 8/2013 | Chen | H04B 3/23 |
| | | | 381/56 |
| 2015/0271593 A1* | 9/2015 | Sun | H04N 7/15 |
| | | | 381/92 |

(Continued)

FOREIGN PATENT DOCUMENTS

EP    3793212 A1    3/2021

*Primary Examiner* — William A Jerez Lora
(74) *Attorney, Agent, or Firm* — Behmke Innovation Group LLC; Jonathon P. Western; James M. Behmke

(57) ABSTRACT

In one embodiment, a multi-microphone system for an endpoint device receives input signals for a remote conference between the endpoint device and at least one other endpoint device. The multi-microphone system may include at least a top microphone unit and a bottom microphone unit. A signal degradation event that causes degradation of signals received by the top microphone unit or the bottom microphone unit is detected. Then, based on information regarding the signal degradation event, it is determined whether the signal degradation event affects one or both of the top microphone unit and the bottom microphone unit. In response, an output signal is generated for transmission to the at least one other endpoint device, and the output signal uses a portion of the input signals that excludes signals received by the top microphone unit and/or the bottom microphone unit determined to be affected by the signal degradation event.

18 Claims, 13 Drawing Sheets

(56) References Cited

U.S. PATENT DOCUMENTS

| | | |
|---|---|---|
| 2015/0312691 A1 | 10/2015 | Virolanen et al. |
| 2016/0078879 A1* | 3/2016 | Lu .......................... G10L 25/81 |
| | | 381/56 |
| 2017/0272878 A1* | 9/2017 | Partio ...................... H04R 3/04 |
| 2018/0035222 A1* | 2/2018 | Anderson ............... H04W 4/06 |
| 2019/0166257 A1 | 5/2019 | Robison et al. |
| 2019/0272842 A1* | 9/2019 | Bryan ................. G10L 21/0272 |
| 2020/0312342 A1 | 10/2020 | Shanmugam et al. |
| 2020/0321021 A1 | 10/2020 | Sereshki et al. |

* cited by examiner

OPTIMIZATION OF MULTI-MICROPHONE SYSTEM FOR ENDPOINT DEVICE

TECHNICAL FIELD

The present disclosure relates generally to audio capture optimization and, more particularly, to the optimization of a multi-microphone system for an endpoint device.

BACKGROUND

The share of the workforce that is working from home has increased dramatically in recent times. Collaboration between remote employees remains necessary, however. As a result, tele- and video-conferences have become a common and valuable resource for many businesses.

Some endpoint devices which are designed specifically with conferencing in mind integrate several individual components-such as a microphone, loudspeaker, camera, and/or video display-into a single unit. These all-in-one endpoints, while certainly convenient, encounter challenges with regard to an acoustical design that ensures high-quality speech acquisition. For instance, the close proximity of the loudspeaker and the microphone frequently results in an increased echo to near-end speech ratio. This phenomenon makes echo control with satisfactory double-talk performance difficult to achieve.

Furthermore, users are often unaware of where the endpoint's microphones and/or loudspeakers are located, or unaware that placing objects too close to the endpoint may degrade speech signal pickup. Placing an object, such as a laptop computer, in front of the microphone, for example, impairs sound quality by removing high-frequency content. It can also increase the acoustic coupling between the loudspeaker and microphone, causing detrimental echo and distortion artifacts at the far-end. Even the sound of the laptop's cooling fan can impair the audio signal through added noise when placed close to the microphone. Although the endpoint device can be elevated from a table surface to reduce the chance of shadowing effects at the microphone, this solution, too, is non-optimal as sound reflection from the table can result in comb-filtering that harms the sound quality all the same.

BRIEF DESCRIPTION OF THE DRAWINGS

The embodiments herein may be better understood by referring to the following description in conjunction with the accompanying drawings in which like reference numerals indicate identical or functionally similar units, of which.

DESCRIPTION OF EXAMPLE EMBODIMENTS

Overview

Figure 1A:
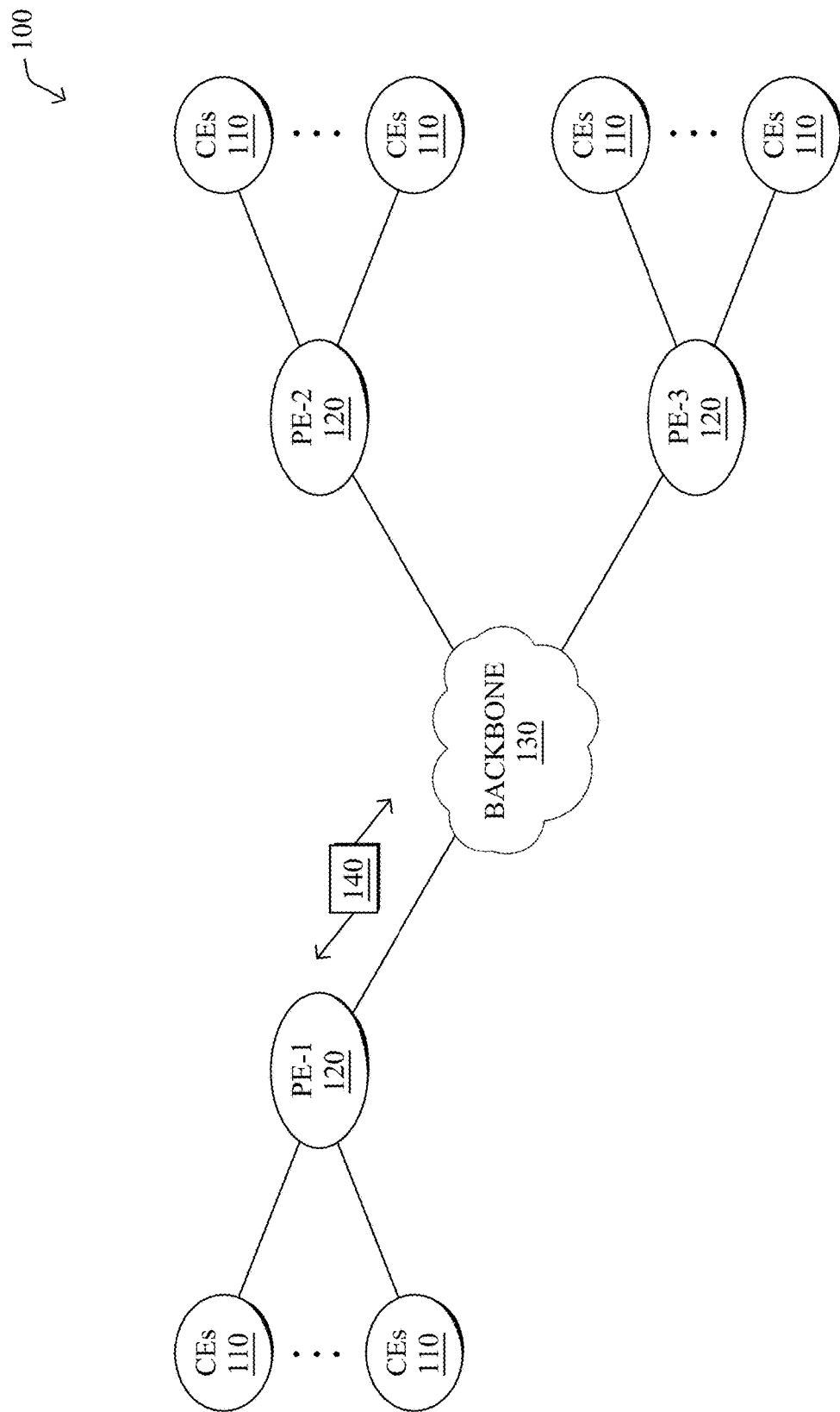
FIGS. 1A-1B illustrate an example communication network.

According to one or more embodiments of the disclosure, input signals are acquired for a remote conference between an endpoint device and at least one other endpoint device. The input signals are received via a multi-microphone system including at least a top microphone unit disposed at a top area of the endpoint device and a bottom microphone unit disposed at a bottom area of the endpoint device. A signal degradation event that causes degradation of signals received by the top microphone unit or the bottom microphone unit is detected. Then, based on information regarding the signal degradation event, it is determined whether the signal degradation event affects one or both of the top microphone unit and the bottom microphone unit. In response to determining that the signal degradation event affects one or both of the top microphone unit and the bottom microphone unit, an output signal is generated for transmission to the at least one other endpoint device, and the output signal uses a portion of the input signals that excludes signals received by the top microphone unit and/or the bottom microphone unit determined to be affected by the signal degradation event.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
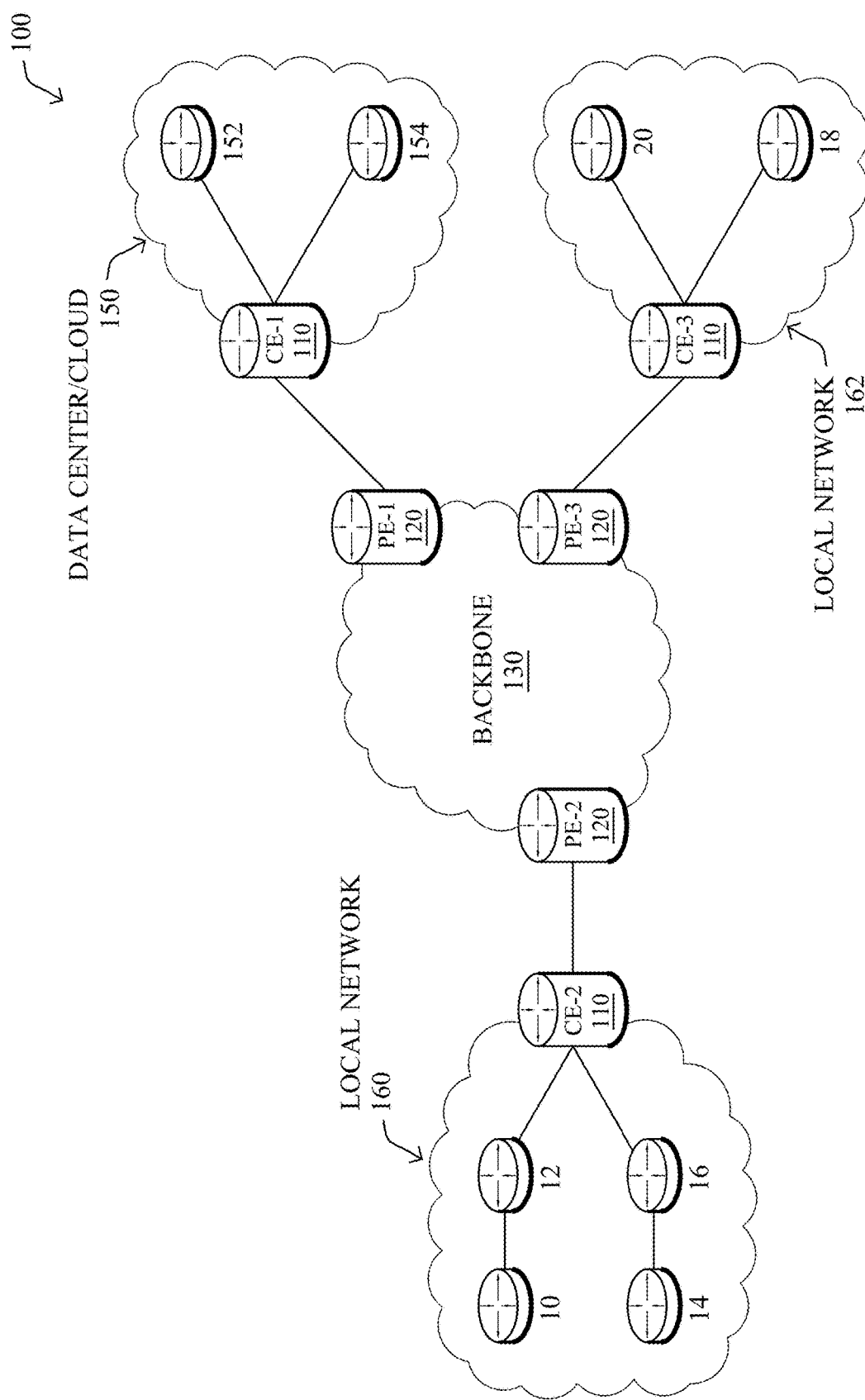

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a portion of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
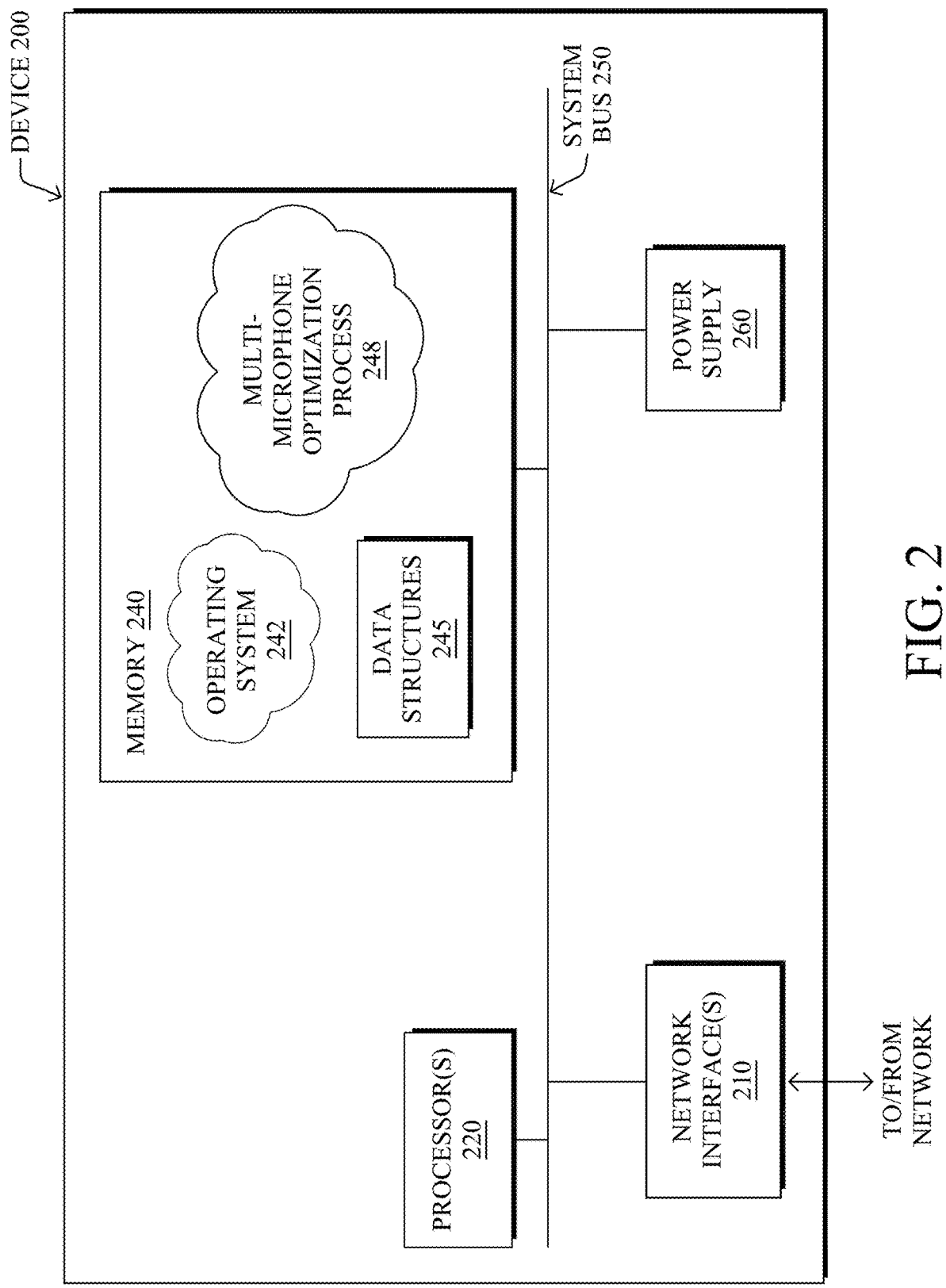
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary units or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a multi-microphone optimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, remote collaboration has become increasing commonplace in recent times. Video conferencing, for instance, allows employees in disparate locations to view and communicate with each other as if present in the same room. It can increase productivity and worker efficiency, while simultaneously saving costs for the employer. At the same time, in order for video conferencing tools to create an enjoyable user experience without disturbances, it is important to ensure that input speech signals can be captured with high quality, i.e., naturally. Some newer endpoint devices which integrate several individual conferencing components—e.g., a microphone, loudspeaker, camera, video display, etc.-enhance user convenience but encounter challenges with regard to an acoustical design that ensures high-quality speech acquisition. For instance, the close proximity of the loudspeaker and the microphone frequently results in an increased echo-to-near-end speech ratio. This phenomenon makes echo control with satisfactory double-talk performance difficult to achieve.

Furthermore, users are often unaware of where the endpoint's microphones and/or loudspeakers are located, or unaware that placing objects too close to the endpoint may degrade speech signal pickup. Placing an object, such as a laptop computer, in front of the microphone, for example, impairs sound quality by removing high-frequency content. It can also increase the acoustic coupling between the loudspeaker and microphone, causing detrimental echo and distortion artifacts at the far-end. Even the sound of the laptop's cooling fan can add noise to and thus impair the audio signal when placed close to the microphone. Although the endpoint device can be elevated from a table surface to reduce the chance of shadowing effects at the microphone, this solution, too, is non-optimal as sound reflection from the table can result in comb-filtering that harms the sound quality all the same.

Optimization Of Multi-Microphone System For Endpoint Device

The techniques herein introduce techniques for enhancing the quality of speech signal acquisition by tele- or video-conferencing endpoint devices using a multi-microphone system, including at least top and bottom microphones, and intelligent switching between microphones, and combinations of microphones, based on detected signal degradation events. In some aspects, techniques are described for detecting events during an ongoing communication session that would potentially degrade input signal quality, such as physical obstructions, noise, table reflection effects, echo levels, double-talk performance, camera shutter operation, and so on. These events can be used as the basis for deciding which microphone, or combination of microphones, should be used at any given time for generating an optimized output signal. In further aspects, the multi-microphone system may comprise one or more dual-microphone arrays positioned at the top and/or the bottom of the endpoint to receive sound from predefined sectors and suppress noise based on spatial separation.

Specifically, according to one or more embodiments of the disclosure as described in detail below, input signals are acquired for a remote conference between an endpoint device and at least one other endpoint device. The input signals are received via a multi-microphone system including at least a top microphone unit disposed at a top area of the endpoint device and a bottom microphone unit disposed at a bottom area of the endpoint device. A signal degradation event that causes degradation of signals received by the top microphone unit or the bottom microphone unit is detected. Then, based on information regarding the signal degradation event, it is determined whether the signal degradation event affects one or both of the top microphone unit and the bottom microphone unit. In response to determining that the signal degradation event affects one or both of the top microphone unit and the bottom microphone unit, an output signal is generated for transmission to the at least one other endpoint device, and the output signal uses a portion of the input signals that excludes signals received by the top microphone unit and/or the bottom microphone unit determined to be affected by the signal degradation event.

Illustratively, the techniques described herein may be performed by hardware, software, and/or firmware, such as in accordance with the multi-microphone optimization process 248, which may include computer executable instructions executed by the processor 220, to perform functions relating to the techniques described herein.

Figure 3:
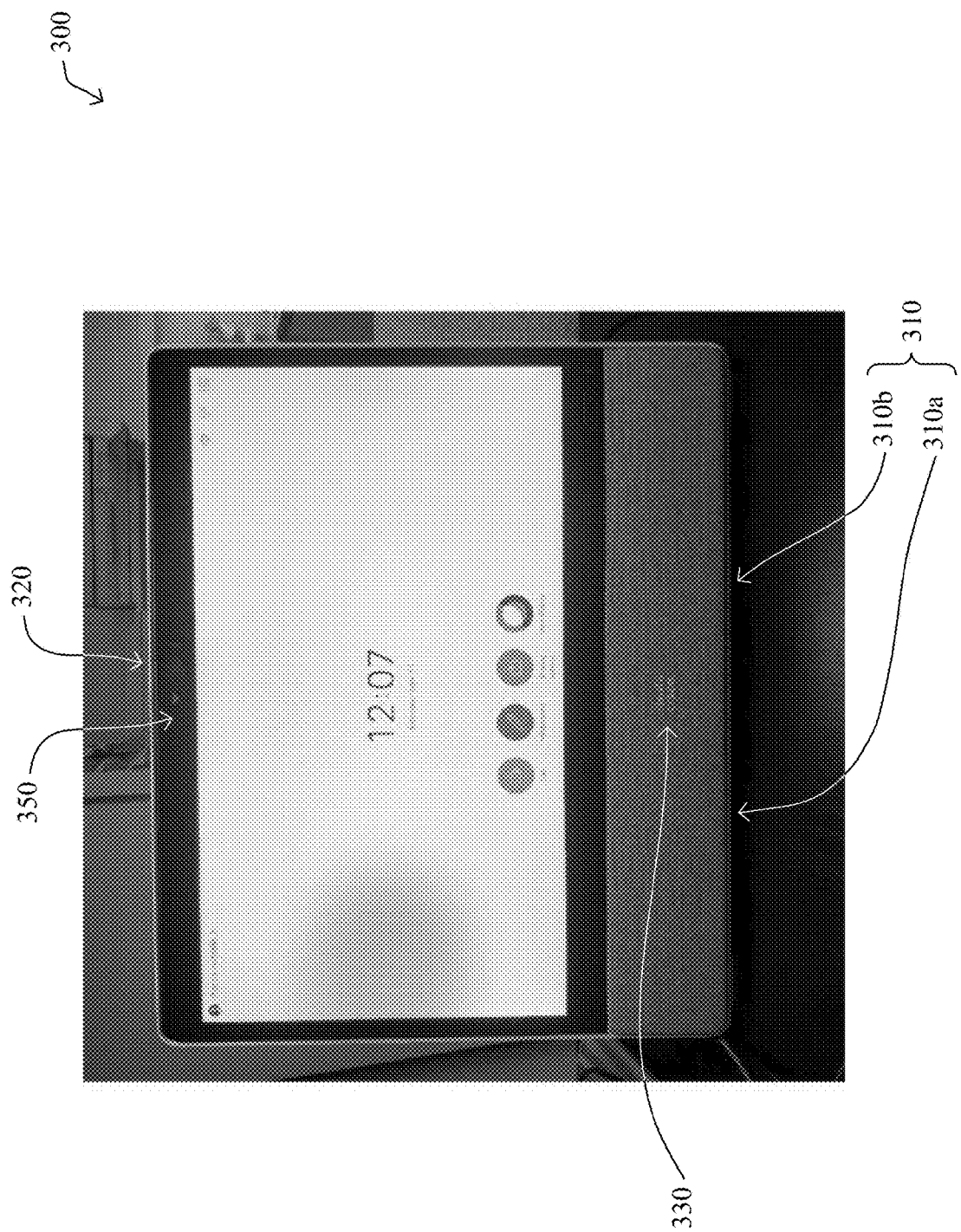
FIG. 3 illustrates an example video conferencing endpoint device.

Operationally, an example video conferencing endpoint device 300 is illustrated in FIG. 3, according to various embodiments. The endpoint device 300, as shown, is a video conferencing endpoint, although the embodiments herein are equally applicable to non-video conferencing endpoints, such as teleconferencing endpoints. According to some embodiments, the endpoint device 300 may be a device (e.g., device 200) in a network comprising the necessary hardware, circuitry, etc. to execute stored instructions (e.g., multi-microphone optimization process 248), those instructions being described in detail herein. More particularly, the endpoint device 300 may be configured to execute a remote conference between the endpoint device 300 and one or more other endpoints. The remote conference, as would be well-understood in the art, may enable two or more users to communicate using voice, video, and the like via various input and output devices of the endpoint devices over a transmission medium in the network.

Endpoint device 300, as shown in FIG. 3, may integrate a plurality of components that enable the conferencing functionality. According to some embodiments, endpoint device 300 may comprise any one or combination of microphone units, such as a bottom microphone unit 310 and top microphone unit 320, loudspeaker 330, video display 340, and video camera 350. Any number and arrangement of the aforementioned components may be utilized by the endpoint device 300. Although endpoint device 300 is shown as a singular, "all-in-one" unit that integrates each of these various components, the endpoint device 300 may instead comprise a series of physically separated components that are operatively coupled together (e.g., via wired connection, wireless connection, etc.) according to some embodiments, or any combination of integrated and physically separated components according to further embodiments. In yet further embodiments, the loudspeaker 330 may be disposed at or near the bottom area proximate to the bottom microphone unit(s) 310, and the video display 340 may be disposed between said bottom area and the top area where the top microphone unit 320 is located, such that the video display 340 positionally separates the top microphone unit 320 from the loudspeaker 330 as well as the bottom microphone unit 310. In yet further embodiments, the endpoint device 300 may be a teleconference device that includes the aforementioned microphone units 310/320 and loudspeaker 330 but without the video display 340 and camera 350. In yet further embodiments, the endpoint device 300 may only include the microphone units 310/320, as an example.

With respect to the microphone elements, in particular, the endpoint device 300 may include a multi-microphone system comprising a plurality of microphone units. In some cases, the microphone units may be omni-directional microphone units. The microphone units may be variously positioned on the endpoint device 300. According to some embodiments, the multi-microphone system may include, at least, a bottom microphone unit 310 disposed at a bottom area of the endpoint device 300 and a top microphone unit 320 disposed at a top area of the endpoint device 300. More precisely, the microphone units may be positioned such that the bottom microphone unit 310 is physically separated from the top microphone unit 320, meaning that the "bottom area" and the "top area" of the endpoint device 300 are similarly physically separated from each other. There may be any number of the bottom and top microphone units, respectively. For instance, as shown in FIG. 3, endpoint device 300 includes one top microphone unit 320 and two bottom microphone units 310. In such configuration, the plural microphone units may be strategically spaced apart from each other to receive input signals from different directions. In other embodiments, endpoint device 300 may include only a single bottom microphone unit 310.

With respect to the bottom microphone units 310, in particular, the endpoint device 300 may include a bottom-left microphone unit 310a disposed at a bottom-left area of the endpoint device 300 and a bottom-right microphone unit 310b disposed at a bottom-right area of the endpoint device 300. According to some embodiments, and as shown in FIG. 3, the bottom-left microphone unit 310a and bottom-right microphone unit 310b may be downward-facing and positioned on the endpoint device 300 at or near the base thereof so as to be as close as practically possible to the table surface on which the endpoint sits. In a well-controlled environment, this is the optimal placement for high-quality speech pickup. It provides broadband and smooth frequency response, constructively utilizing the table/boundary reflection.

However, when these bottom microphones are utilized on its own (i.e., without supplemental microphones), certain challenges arise:
The microphone units are easily shadowed or obstructed.
Noise resulting from a computer or laptop fan, handling of objects, and so on can be picked up with extra emphasis.
The distance to nearby loudspeakers can be very short, increasing echo levels and echo to near-end speech ratios, and thereby inhibiting echo control and double-talk performance.
Distortion in the echo path cannot be handled by traditional linear-adaptive filters in the echo canceller.

As an example, in the event that a laptop computer resting on the table surface is placed in front of a base (bottom) microphone, the affected microphone may likely experience shadowing which leads to a low-pass effect, as low-frequency sound waves diffract around the obstacle and are picked up by the microphone, while high-frequency sound waves are blocked or severely attenuated. The present application counteracts this problem of shadowing by utilizing multiple, well-separated microphones at the base of the endpoint device 300—e.g., bottom-left microphone unit 310a and bottom-right microphone unit 310b. At any given time, the input signal received by the bottom microphone unit 310 that is least obstructed may be selected, as described in greater detail below.

While using multiple, separated bottom microphone units 310 is beneficial, particularly in the case of a physical obstruction being placed in front of one, but not both, microphone units, the concern of high echo levels, shadowing effects, and poor double-talk performance still exists when the only microphone units are located on the bottom of endpoint device 300. Therefore, the present application seeks to resolve this issue by also utilizing a top microphone unit 320 that is spaced apart from the bottom microphone units 310, as well as the integrated loudspeaker unit 330. According to some embodiments, the top microphone unit 320 may be front-facing and disposed at a top area of the endpoint device 300, as shown in FIG. 3. In such case, the top microphone unit 320 may be positionally separated from the bottom microphone units 310 by the video display 340. According to other embodiments, the top microphone unit 320 may be disposed along the sides of the endpoint device 300 (e.g., positioned to the left and/or right of the video display 340). Utilizing the top microphone unit 320 in conjunction with the bottom microphone unit 310 can advantageously reduce echo levels by increasing the distance between the endpoint's microphone units and the loudspeaker 330, enhance double-talk performance, and also mitigate shadowing effects.

Nevertheless, even with the benefits that accompany the top and bottom microphone arrangement illustrated in FIG. 3, certain events, such as physical obstructions, table reflections, high noise levels, and so forth, may occur for a remote conference that degrade the quality of the input signals received by the microphone units. The present application, therefore, seeks to detect these signal degradation events in real-time during an ongoing conference and intelligently select a microphone unit, or combination of microphone units, for use based on a detected degradation event. The input signals received by the selected microphone unit(s) may be extracted from the received input signals and used to generate an output signal for transmission to another endpoint, while other input signals determined to be affected by the degradation event are excluded.

Figure 4:
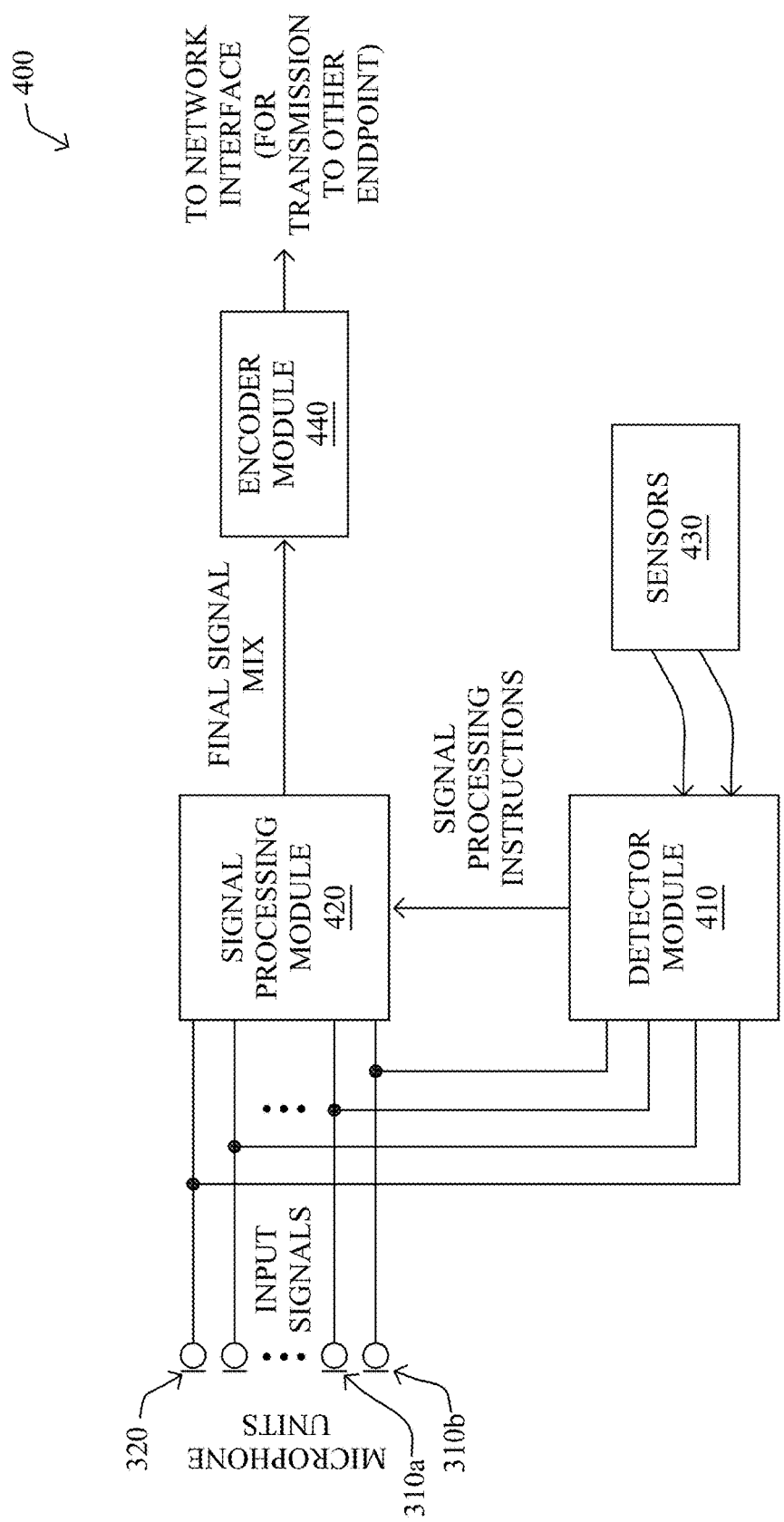
FIG. 4 illustrates an example architecture for optimizing a multi-microphone system of an endpoint device.

In detail, FIG. 4 illustrates an example architecture 400 for optimizing the multi-microphone system of endpoint device 300, according to various embodiments. Any or all of the components of architecture 400 may be implemented on-premise as part of the endpoint device 300. For example, detector module 410, signal processing module 420, sensors 430, and encoder module 440, as well as microphone units 310 and 320, may be integrated in the endpoint device 300, and therefore operate locally thereon. In other embodiments, one or more of these components may be independent of, but operatively coupled to, the endpoint device 300. For example, one or more the sensors 430 may not be integrated in the endpoint device 300 but instead comprise standalone sensors that are nonetheless configured to transmit (e.g., via a wired connection, a wireless connection, etc.) sensed information to the detector module 410. In another example, signal processing module 420 may not be a local module of endpoint device 300 but instead operate in the cloud (e.g., on a remote server) where additional computing resources are available. It should therefore be understood that the architectural diagram shown in FIG. 4 is provided merely for illustration purposes and does not limit the scope or implementation of the techniques described herein.

Microphone units, including bottom-left microphone unit 310a, bottom-right microphone unit 310b, and top microphone unit 320, are shown on the left end of architecture 400. As explained above, the microphone units may receive input signals, e.g., speech signals, for a remote conference. For instance, a user of the endpoint device 300 may be engaged in a call with co-workers across one or more other endpoints. The input signals received by the various microphone units may comprise, notably, the user's speech. The input signals may also comprise other artifacts, however, that potentially compromise the signal quality of the user's speech, such as outside noise due to sound emitted from the loudspeaker 330, a fan of a nearby laptop computer, a camera shutter, echo, and so forth. The raw input signals as received from the microphone units may be provided both to the detector module 410 and the signal processing module 420 for further analysis and processing, as will be described below.

According to further embodiments, the top microphone unit 320 may comprise dual microphone units separated from each other (e.g., 17 mm). The dual top microphones may be used to estimate the direction of arrival of the input signals. For instance, assume an audio signal is acquired from one of the two microphones, from a third microphone, or from a microphone array. This audio signal is then processed in such a way that audio originating from undesired directions is attenuated. This enables the attenuation of audio originating from undesired directions. As such, the dual top microphone units may be used specifically for estimating the direction or arrival, whereas the remaining microphone units receive signals specifically for processing, as described herein. In yet further embodiments, face detection based on the video image from the camera 350 may be utilized so any audio originating from a direction where no face is detected can be attenuated.

Meanwhile, the architecture 400 may collect information used for detecting whether a signal degradation event is present. A signal degradation event, for the purposes of the present application, may refer to an event that causes signal degradation of signals received by any one or more of microphone units of the endpoint device 300. In response, a portion of the input signals that is negatively affected by the signal degradation event may be excluded to generate an optimized output signal for transmission to another endpoint device, as will be described in detail later.

Numerous possible signal degradation events are envisioned herein, as are the responses to each signal degradation event, and also the techniques for detecting the signal degradation events for a remote conference. Possible signal degradation events may include, but are not limited to:

a physical obstruction of one or more microphone units;

high levels of noise caused by sound from a nearby loudspeaker (e.g., loudspeaker 330), a computer or laptop cooling fan, a user typing on a keyboard, a user handling or moving a nearby object, a camera shutter, nearby RF-emitting sources, and the like;

excessive echo or high levels of sound from the loudspeaker 330;

double-talk situations (i.e., multiple users in multiple locations talking at once); and signal reflections caused by nearby surfaces (e.g., a table, wall, etc.).

Each of the signal degradation events may degrade the quality of speech signals from a user of the endpoint device 300, diminishing the overall experience of the tele- or video-conference. Given the placement of the various microphone units, as illustrated in FIG. 3, any given signal degradation event may negatively affect one particular microphone unit more than the others. Put another way, there is typically at least one microphone unit that is not negatively affected by the event. Therefore, detecting the signal degradation event as it occurs enables architecture 400 to promptly identify the suffering microphone unit and decide which other microphone unit, or combination of microphone units, may provide the highest quality signal.

Detector module 410 may execute stored program instructions (e.g., multi-microphone optimization process 248) to detect the presence of a signal degradation event. For example, detector module 410 may assess the input signals received by top and bottom microphone units 310/320 to determine whether there is evidence of signal degradation. Additionally, sensor data obtained by one or more additional sensors 430 may be provided to the detector module 410 for processing in conjunction with the input signals received by the microphone units 310/320. The data provided from sensors 430 may be utilized by the detector module 410 to measure noise levels, echo levels, and so on, each of which may represent indicators of a signal degradation event. According to some embodiments, the sensors 430 may include, for example, an ultrasonic sensor, camera, additional microphone units, or any other known sensor (e.g., buttons, touch screen, etc.) or combination of sensors. The sensors 430 may be external to the endpoint device 300 in some cases, or integrated in the endpoint device 300 in other cases.

Figure 5:
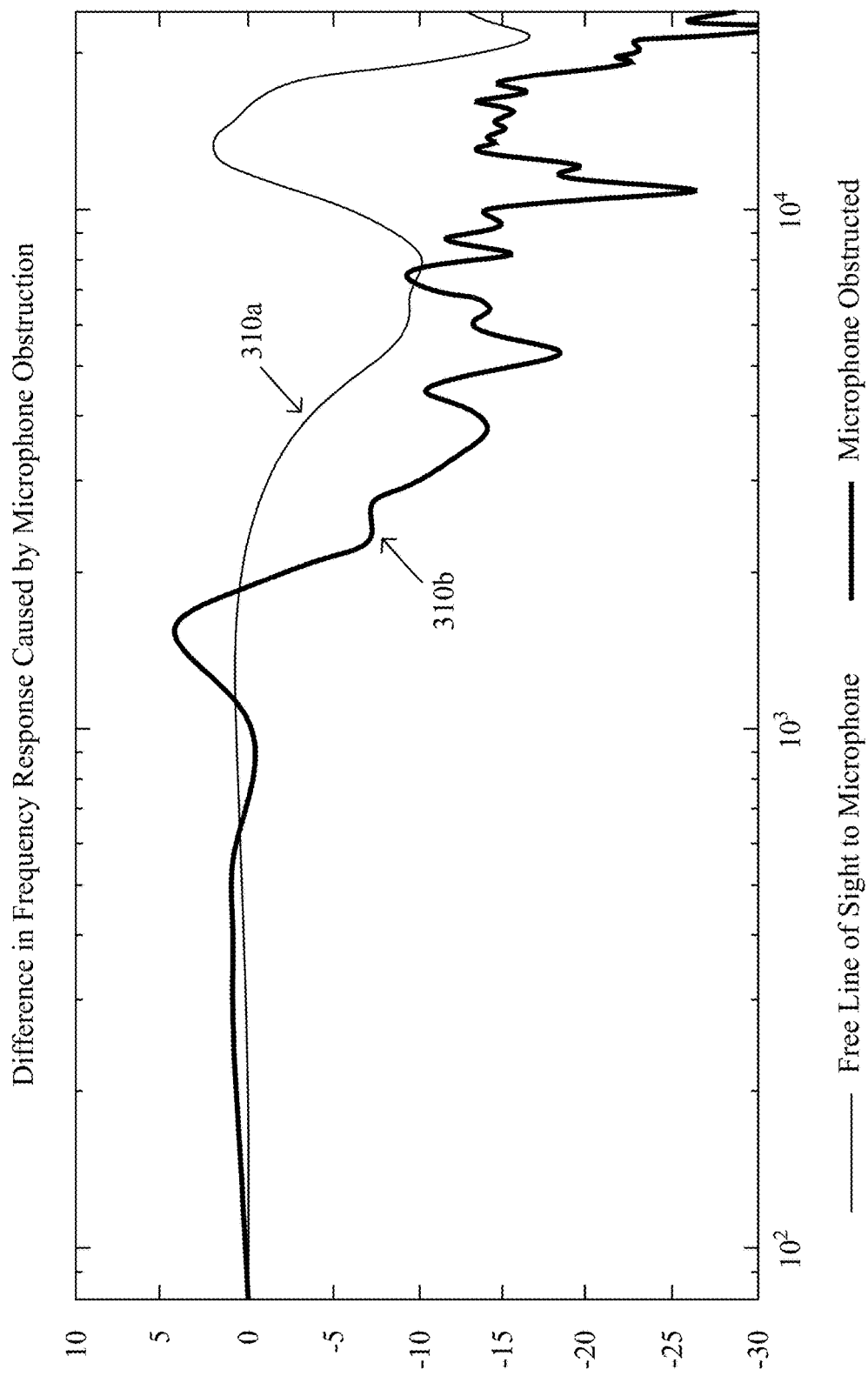
FIG. 5 illustrates an example comparison of audio signals received by dual microphone units, one of which is affected by a physical obstruction.

Detector module 410 may employ a variety of possible techniques based on available information (e.g., from sensors 430, microphone units 310/320, system bus 250, etc.) to detect a signal degradation event. For illustration, provided below is a list of several examples in which detector module 410 detects a signal degradation event that affects the endpoint device 300:

A physical obstruction inhibiting signal pickup of any one or more of microphone units 310/320 may be detected by comparing the spectrum of the audio signals from two or more of the microphone units. For example, FIG. 5 illustrates an example comparison of audio signals received by dual microphone units, one of which is affected by a physical obstruction. Assume, for instance, the detector module 410 compares input signals received by bottom-left microphone unit 310*a* with input signals received by bottom-right microphone unit 310*b*. As shown, there is a noticeable difference in frequency content between the signals, revealing significant high-frequency loss in the signal received by bottom-right microphone unit 310*b*. Comparing the spectrum of signals received by two or more microphone units facilitates detecting whether the direct path between the signal source and any of the microphone units is obstructed. The detector module 410 may thus conclude in this case that the bottom-right microphone unit 310*b* is physically obstructed, while there is a free line of sight to bottom-left microphone unit 310*a*.

Alternatively, a physical obstruction inhibiting signal pickup of any one or more of microphone units 310/320 may be detected by using ultrasonic distance estimation. For instance, an ultrasonic sensor (e.g., sensor 430) may transmit ultrasonic signals toward a location where a physical obstruction may be present. The sensor may then measure time lapses between transmission and receipt of the signals to estimate the distance between the sensor and another object nearby. The results may be processed by detector module 410 to detect whether or not a physical obstruction is present.

Noise generated by a fan of a nearby laptop or computer may be detected by analyzing the input signals received by top and bottom microphone units 310/320, or other external microphone units, and determining the presence of stationary noise at higher frequencies.

Noise created by typing on a keyboard or moving an object (e.g., a laptop, cup, papers, etc.) may be detected using machine learning-based techniques. For example, a machine learning-based model that is trained to discern between said noise and standard speech signals may be employed by detector module 410 to detect whether or not such noise is present in the input signals.

An occurrence of double-talk (i.e., multiple users speaking at once) may be detected by monitoring the output level of loudspeaker 330. If the loudspeaker output level is relatively high, indicative of another user's speech, while the input signals received by top and bottom microphone units 310/320 similarly indicate that the user of endpoint device 300 is speaking, detector module 410 may conclude that double-talk is happening.

High echo levels and potential distortion problems may also be predicted based on the output level of the loudspeaker 330. Alternatively, a high level of echo may be detected using information obtained from echo cancelation filters. According to some embodiments, there may be a separate echo cancelation filter for each microphone unit of endpoint device 300 that executes prior to signal processing (e.g., combining, filtering, switching, etc.) by signal processing module 420. The echo cancelation modules' own estimate of how well they performed in removing the echo from their respective microphone signal may also be used to choose the microphone unit with the least far-end echo to improve double-talk response.

Noise created by a camera shutter operation of video camera 350, which is integrated in endpoint device 300 as shown in FIG. 3, may be detected based on a built-in hardware function that is triggered when the camera shutter is activated. In other cases (e.g., when there is no built-in hardware function to detect a camera shutter), the input signals received by top and bottom microphone units 310/320 may be processed in a manner similar to the above to determine whether there is a relatively high level of impulsive noise. Depending on the layout of the endpoint device 300, recent interaction with buttons close to one or more of the microphone units may indicate that a particular microphone unit is not obstructed. This information may be used to select this particular microphone unit or give it a preferred status in signal quality evaluation.

Upon detecting a signal degradation event, the detector module 410 may use information regarding the signal degradation event to determine whether the signal degradation event affects one or both of the top microphone unit 320 and the bottom microphone unit(s) 310. Furthermore, given the microphone unit(s) determined to be affected, detector module 410 may identify the optimal microphone unit whose received input signals will be used for generating an output signal to be transmitted to another endpoint device in communication with endpoint device 300. In many cases, the optimal microphone unit for generating the output signal may be the microphone unit that is not affected, or least affected, by the detected signal degradation event. Input signals received by the affected microphone unit, by contrast, may be excluded from the output signal so as to ensure a high level of quality in the outgoing signal.

To demonstrate, FIGS. 6A-6F illustrate various examples of signal degradation events affecting the multi-microphone system of endpoint device 300. Detector module 410 may employ any of the aforementioned techniques for detecting these signal degradation events, or any other known signal processing techniques not specifically mentioned herein, as would be appreciated by a person of ordinary skill in the art.

Figure 6A:
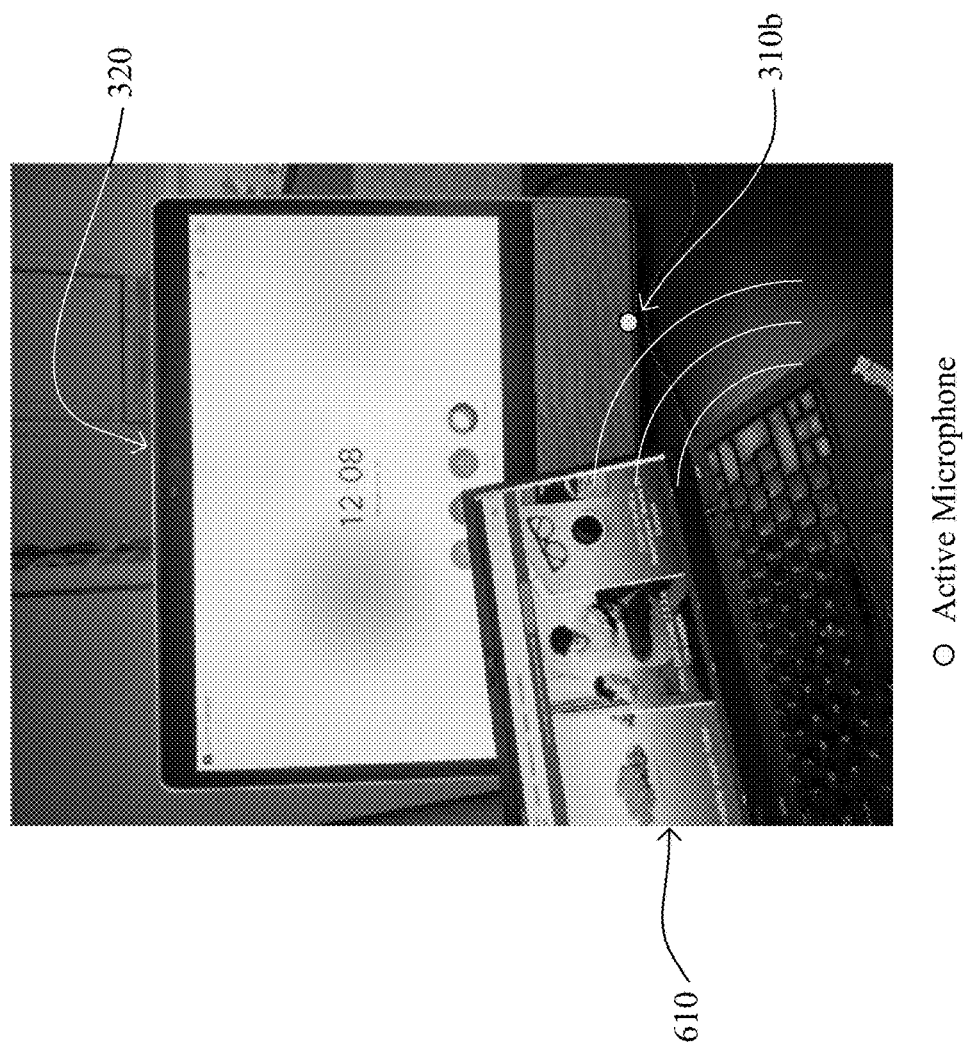
FIGS. 6A-6F illustrate examples of signal degradation events affecting a multi-microphone system of an endpoint device.

FIG. 6A illustrates a signal degradation event in which a physical obstruction 610 (e.g., a laptop computer) is placed in front of the bottom-left microphone unit 310*a*, thereby inhibiting its signal pickup quality. According to some embodiments, the detector module 410 may detect the obstruction 610 based on spectral analysis (e.g., see FIG. 5) or analysis of sound wave reflections. Obstruction of the bottom-left microphone unit 310*a* may cause a loss of high-frequency content in its received input signals. On the other hand, the bottom-right microphone unit 310*b* is not affected, or at least less affected, by the physical obstruction 610. Top microphone unit 320 is similarly unaffected by the physical obstruction 610. In this situation, the optimal solution as decided by detector module 410 is to use only input signals received by the unobstructed (or less obstructed) bottom-right microphone unit 310*b* for the purpose of generating an output signal, while excluding those signals received by the obstructed bottom-left microphone unit 310*a*. As such, bottom-right microphone unit 310*b* is shown as the only active microphone in FIG. 6A. Optionally, input signals received by the top microphone unit 320 may also be used, in some embodiments.

Figure 6B:
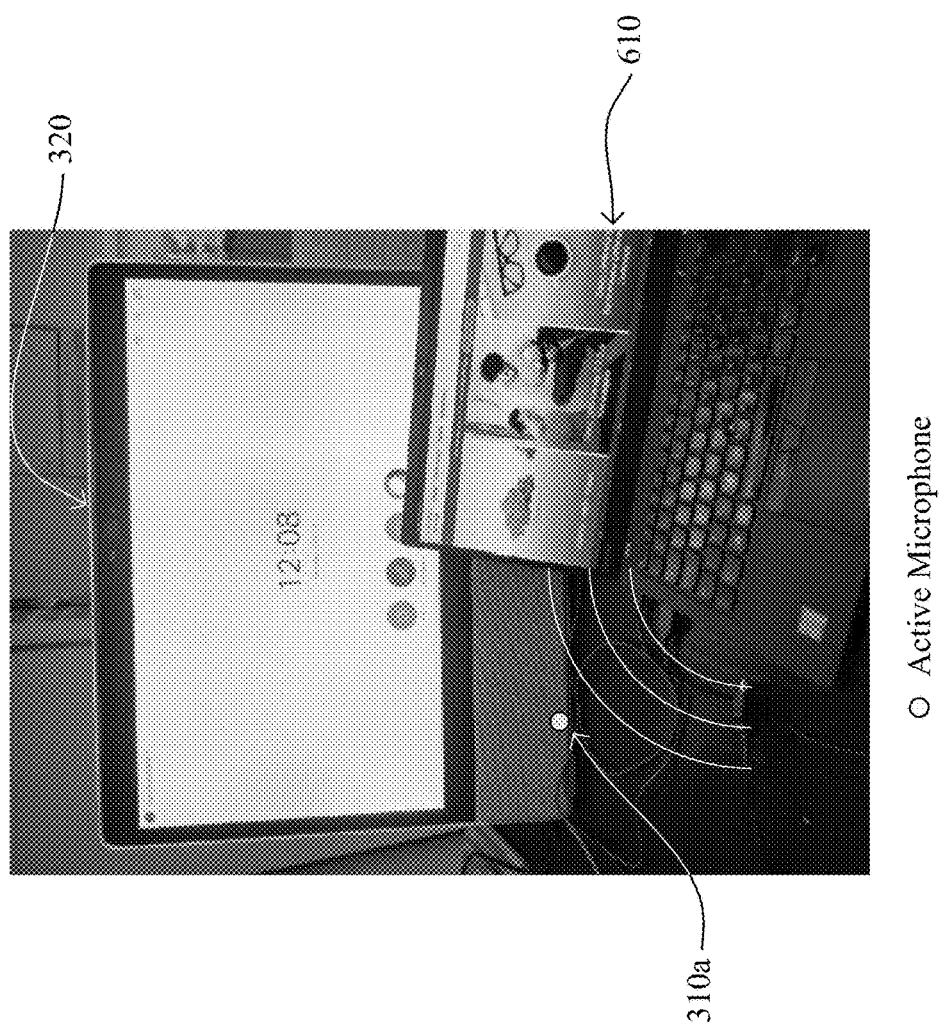

FIG. 6B represents the converse of FIG. 6A. Specifically, FIG. 6B illustrates a signal degradation event in which a physical obstruction 610 (e.g., a laptop computer) is placed in front of the bottom-right microphone unit 310*b*, thereby inhibiting its signal pickup quality. According to some embodiments, the detector module 410 may detect the obstruction 610 based on spectral analysis (e.g., see FIG. 5) or analysis of sound wave reflections. Obstruction of the bottom-right microphone unit 310*b* may cause a loss of high-frequency content in its received input signals. On the other hand, the bottom-left microphone unit 310*a* is not affected, or at least less affected, by the physical obstruction 610. Top microphone unit 320 is similarly unaffected by the physical obstruction 610. In this situation, the optimal solution as decided by detector module 410 is to use only input signals received by the unobstructed (or less obstructed) bottom-left microphone unit 310*a* for the purpose of generating an output signal, while excluding those signals received by the obstructed bottom-right microphone unit 310*b*. As such, bottom-left microphone unit 310*a* is shown as the only active microphone in FIG. 6B. Optionally, input signals received by the top microphone unit 320 may also be used, in some embodiments.

Figure 6C:
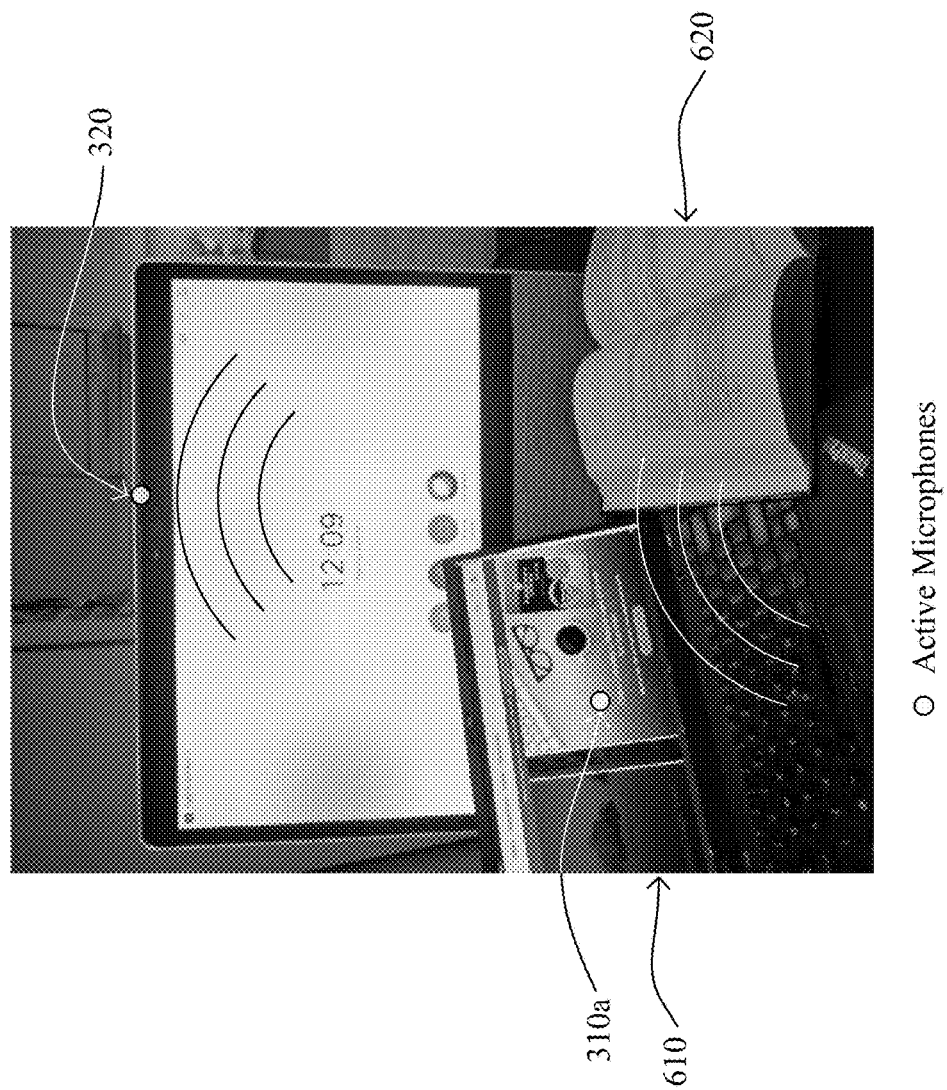

FIG. 6C illustrates a signal degradation event in which physical obstructions affect both of the bottom-left and bottom-right microphone units 310*a*/310*b*. Specifically, a physical obstruction 610 (e.g., a laptop computer) is placed in front of the bottom-left microphone unit 310*a*, thereby inhibiting its signal pickup quality, and another physical obstruction 620 (e.g., a book) is placed in front of the bottom-right microphone unit 310*b*, thereby inhibiting its signal pickup quality, as well. In other embodiments, it may be the same physical obstruction that affects both of the bottom-left and bottom-right microphone units 310*a*/310*b*. Because both the bottom-left microphone unit 310*a* and bottom-right microphone unit 310*b* are obstructed, the input signals received by both bottom microphone units 310 may suffer a loss of high-frequency content. However, although higher frequency sound waves are shadowed (i.e., they cannot reach the obstructed microphone units), the lower frequency sound waves diffract around objects, and may still reach the obstructed microphone units. Thus, the detector module 410 may decide to use only the low-frequency content of the input signals received by one of the bottom-left and bottom-right microphone units 310*a*/310*b*, while excluding the high-frequency content of the same. The top microphone unit 320, meanwhile, remains unobstructed and enjoys a free line of sight to the user. Although table surface reflections may cause a sub-optimal comb-filtering effect at the top microphone unit 320 (e.g., see FIG. 6D), comb-filtering is generally less noticeable at higher frequencies. Thus, in this situation, the optimal solution as decided by detector module 410 is to mix the high-frequency content of input signals received by the top microphone unit 320 with the low-frequency content of input signals received by one of the bottom-left and bottom-right microphone units 310*a*/310*b*. As such, bottom-left microphone unit 310*a* and top microphone unit 320 are shown as the only active microphones in FIG. 6C (bottom-right microphone unit 310*b* may be activated instead of bottom-left microphone unit 310*a*). Notably, to avoid comb-filtering in the crossover band from time-domain filtering and mixing, input signals received by the aforementioned microphone units may be mixed by combining frequency bins from different microphone units' frequency spectrums.

Figure 6D:
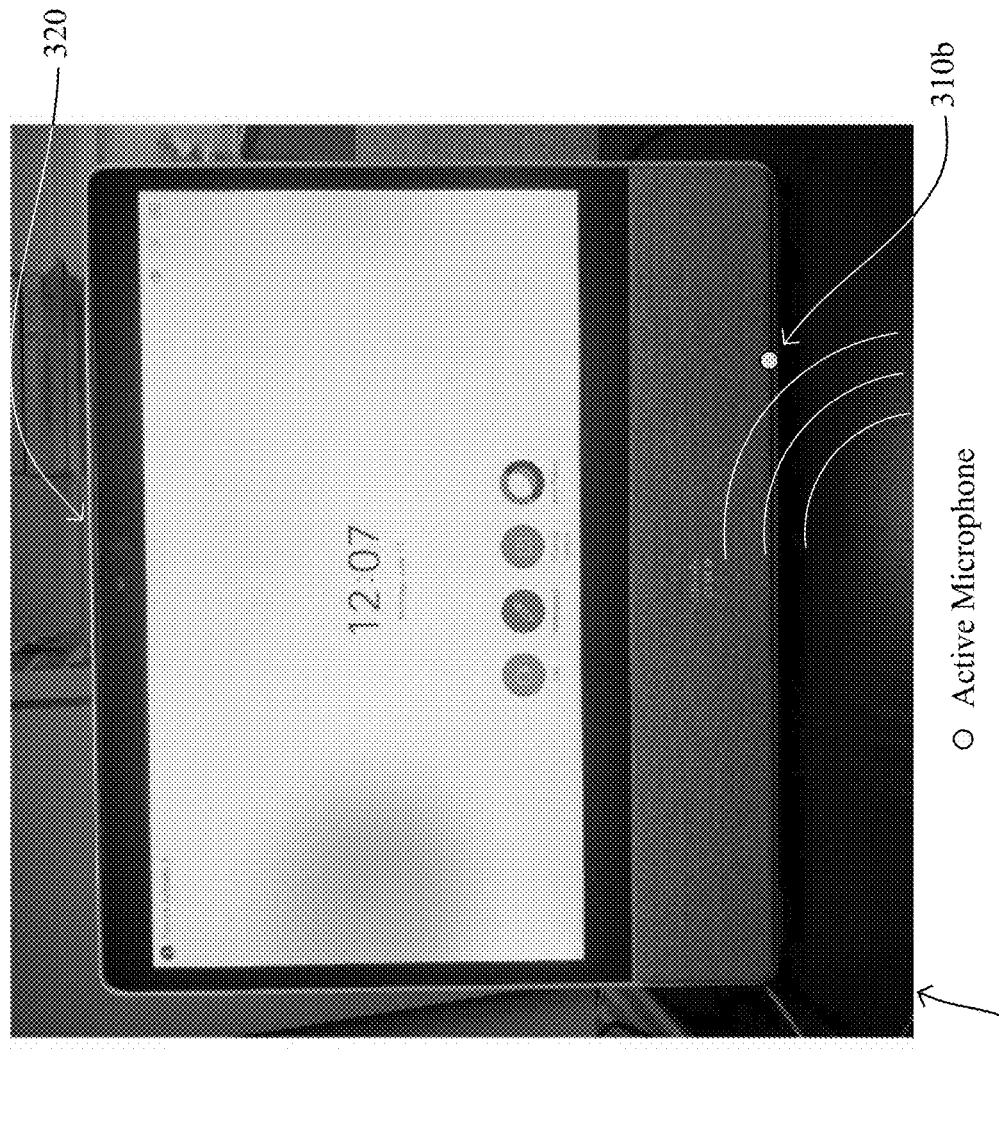

FIG. 6D illustrates a signal degradation event in which the table surface 630 under endpoint device 300 causes a reflection of the input signals received by the top microphone unit 320, thereby resulting in a comb-filtering effect which compromises the signal quality of the top microphone unit 320. The bottom-left and bottom-right microphone units 310*a*/310*b*, meanwhile, are neither physically obstructed nor affected by the table reflections, as the bottom microphone units 310 are positioned at the base of the endpoint device 300 and thus proximate to the table surface 630. In some embodiments, this may constitute the system's "default" situation in which the bottom microphone units 310 are unobstructed and some degree of table reflection affecting the top microphone unit 320 is assumed by virtue of the endpoint device 300 being placed on the table surface 630. In this situation, the optimal solution as decided by detector module 410 is to utilize the boundary effect by using only input signals received by the bottom-left microphone unit 310*a* and/or bottom-right microphone unit 310*b* for the purpose of generating an output signal, while excluding the compromised signals received by the top microphone unit 320. As such, bottom-right microphone unit 310*b* is shown as the only active microphone in FIG. 6D (bottom-left microphone unit 310*a* may be activated instead of, or in addition to, bottom-right microphone unit 310*b*).

Figure 6E:
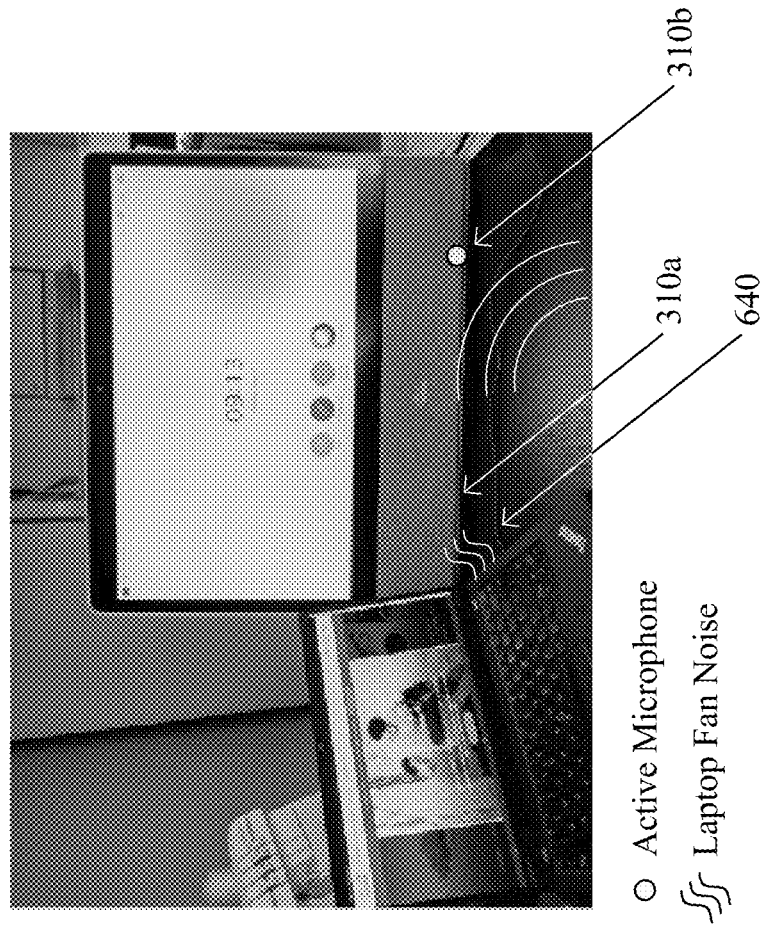

FIG. 6E illustrates a signal degradation event in which a high level of noise 640 is affecting one or more of the bottom-left and bottom-right microphone units 310*a*/310*b*. Although there is a free line of sight to each of the bottom microphone units 310 (i.e., each microphone unit is unobstructed), excessive noise may cause distortion of the received input signals. The noise 640 may be caused by any number of events, such as a fan of a nearby laptop or computer, typing on a keyboard, handling of objects on the table surface 630, and so on. In this situation, the optimal solution as decided by detector module 410 is to compare the noise levels experienced at each of the bottom microphone units 310 and select the input signals from the microphone unit 310*a* or 310*b* with the lowest noise level for the purpose of generating an output signal, while excluding the input signals received by the microphone unit 310*a* or 310*b* with the highest noise level. The detector module 410 may determine whether to perform the above action based on whether the level of noise 640 exceeds a predefined threshold (i.e., whether the noise level is sufficiently high to be disruptive), according to some embodiments. As shown, noise 640 caused by the fan of a laptop computer positioned on the left-hand side of the endpoint device 300 is adversely affecting only the bottom-left microphone 310a (or adversely affecting the bottom-left microphone 310a more than the bottom-right microphone unit 310b). Bottom-right microphone unit 310b, therefore, is shown as the only active microphone in FIG. 6E. Conversely, if a high level of noise 640 affects the top microphone unit 320 (e.g., due to a camera shutter operation of camera 350), the bottom microphone units 310 may be used while the top microphone unit 320 is deactivated temporarily. According to other embodiments, spectral analysis of the input signals may be used to distinguish between noise and speech. According to even further embodiments, detector module 410 may execute a machine learning-based model trained to discern between noise and speech in the input signals. In cases where noise is found to be limited to certain frequency bands, the signal from other microphone unit(s) may be used for these bands.

Figure 6F:
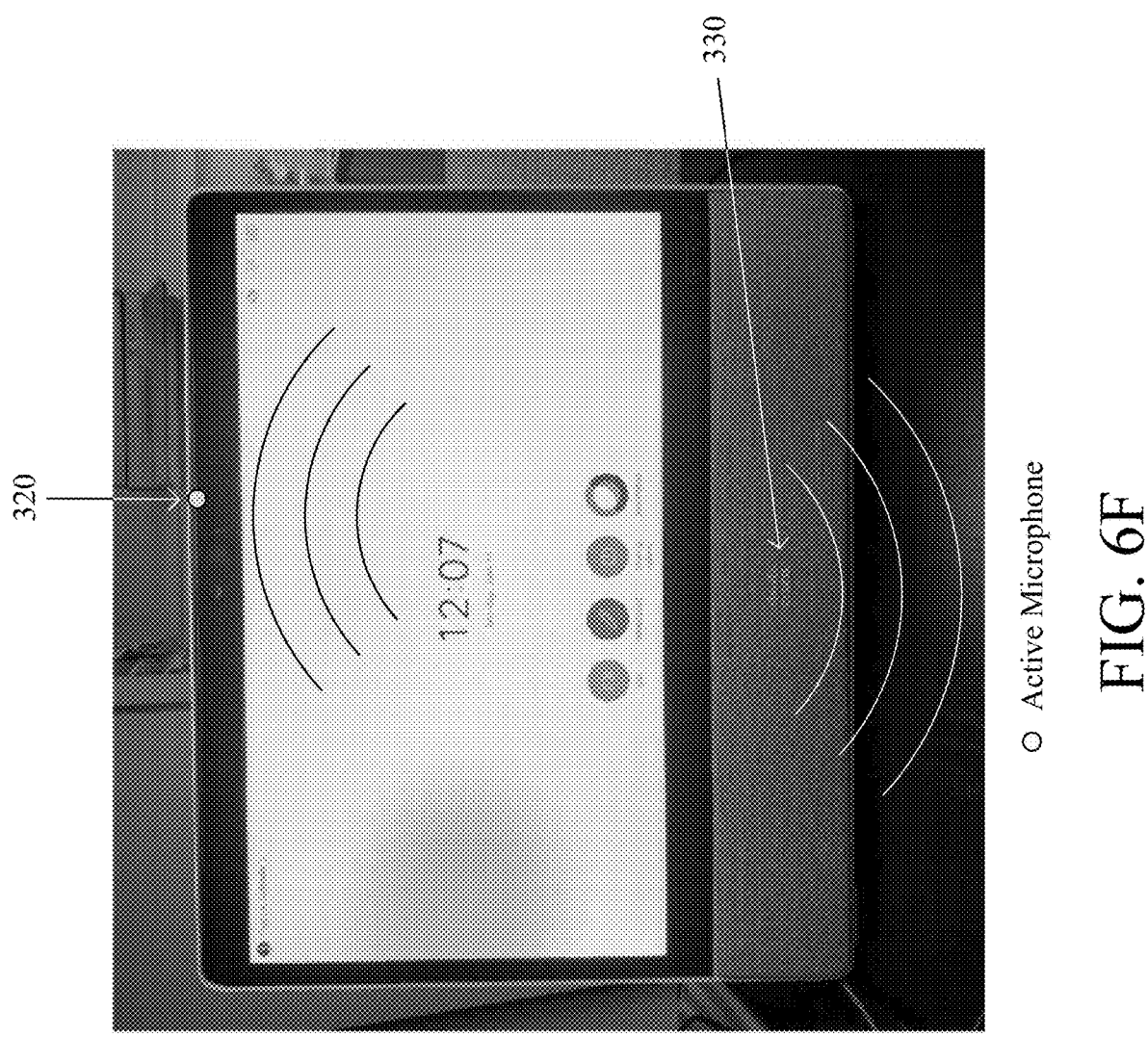

FIG. 6F illustrates a signal degradation event in which audio emitted from the loudspeaker 330 (e.g., the voice of a conference participant using another "far-end" endpoint device) interferes with input signals received by the bottom-left and bottom-right microphone units 310a/310b. At higher volume settings or with high signal levels being received from the far-end, the sound pressure levels (SPL) at the bottom microphone units 310 close to the loudspeaker 330 may produce distortion artifacts (e.g., harmonic distortion and/or high output causing analog-to-digital converter (ADC) clipping) in the microphone signal path. Moreover, inherent loudspeaker non-linearities may cause distorted direct sound—from loudspeaker 330 to the bottom-left and bottom-right microphone units 310a/310b—and distorted room reflections picked up by the microphone units. Furthermore, vibration transfer through the mechanical structure from the loudspeaker 330 to the microphone units may occur, often leading to distortion artifacts. The vibrations may even create airborne noise (e.g., rub and buzz distortion) that is picked up by the microphone units. Each of these cases may cause an acoustic echo canceller (AEC) in signal processing module 420 to perform poorly, which results in the far-end participant hearing echoes or even distorted echoes of the signal transmitted by the far-end participant. In this situation, the optimal solution as decided by detector module 410 is to use only input signals received by the microphone unit(s) located furthest from the active loudspeaker 330—in this case, the top microphone unit 320—as said unit(s) will receive lower levels of direct sound, while excluding input signals received at the bottom microphone units 310. This reduces the risk of distortion, as well as the possibility of audible echoes for the far-end participant. As such, top microphone unit 320 is shown as the only active microphone in FIG. 6F. The distance between the top microphone unit 320 or bottom microphone units 310 may be estimated by detector module 410 simply by knowing a position of each microphone unit in relation to the integrated loudspeaker 330 of endpoint device 300, according to some embodiments. In other embodiments, ultrasonic sensors (e.g., sensors 430) may be utilized to estimate a distance between each of the microphone units and the loudspeaker, particularly if the loudspeaker is external to the endpoint device 300.

Another important consideration in the above scenario is preserving full-duplex communication across near- and far-end participants of the conference. In the event that the AEC of signal processing module 420 is unable to remove a residual echo signal, it is commonly removed by non-linear processing (NLP), which also affects the near-end signal and thus compromises full-duplex communication. A larger distance between the active loudspeaker 330 and the active microphone units reduces the level of the significant echo caused by the direct sound from loudspeaker 330 to the bottom microphone units 310. This reduces the level of the echo the AEC seeks to remove and, in cases where it does not satisfactorily remove it, does not require the NLP to behave as aggressively. This in turn may preserve full-duplex communication. In general, the simplest way by which detector module 410 may select the microphone unit most likely to ensure the best full-duplex performance is to identify the microphone unit furthest away from the active loudspeaker 330 while the loudspeaker 330 is playing audio. The AEC's metrics for how much of the AEC reference, the signal received from far-end, is picked up by a microphone unit may be used in cases where a microphone unit further from the active loudspeaker 330 receives higher levels of sound because of reflections, e.g., from the table surface 630. In other embodiments, microphone choice may also be motivated by comparing echo canceller metrics, such as the amount of non-linear processing (NLP) applied. High non-linear processing attenuation for one or more microphone units suggests poor echo canceller performance and may lead processing module 420 to use the signal, or portions of a signal, from a microphone unit for which the AEC performs better.

With these example scenarios in mind, it should be understood that the conditions during any conference may frequently change. To provide the best signal quality as the conference progresses, the various techniques described herein may be employed and combined as needed based on the current circumstances, considering both local conditions and far-end signal characteristics.

Referring briefly again to FIG. 4, once a signal degradation event has been detected by the detector module 410, and it has determined that one or more of the microphone units 310/320 are affected by the event, according to the various techniques described above, the detector module 410 may provide signal processing instructions to the signal processing module 420 for generating an optimized output signal that will be transmitted to at least one other endpoint device. According to some embodiments, the signal processing instructions may instruct the signal processing module 420 to use a specific portion of the input signals based on which of the top and bottom microphone units 310/320 are determined to be affected by the signal degradation event. Specifically, the portion of input signals may include signals received by the microphone unit that is unaffected, or less affected, by the signal degradation event, while excluding signals received by the microphone unit that is more affected by the signal degradation event. This way, the output signal that is transmitted to at least one other endpoint devices contains minimal amounts of distortion, echo, or other artifacts that compromise signal quality.

After processing the input signals according to the signal processing instructions provided by detector module 410, the signal processing module 420 may create a final signal mix. To this end, a plurality of virtual microphone signals may be created based on the signals from one or more of the microphone units (e.g., bottom-left microphone unit, bottom-right microphone unit, top microphone unit, bottom-left microphone unit and top microphone unit, bottom-right microphone unit and top microphone unit, and so on), and the detector module 410 may select the best signal among the plurality of virtual microphone signals, according to some embodiments. The signal mix may be provided to the encoder module 440, which then encodes the signal mix for transmission. The encoder module 440 may then send the encoded signal to the network interface (e.g., network interface 210) for transmission to at least one other endpoint device. It should be appreciated that this process may repeat throughout the duration of the conference.

Figure 7:
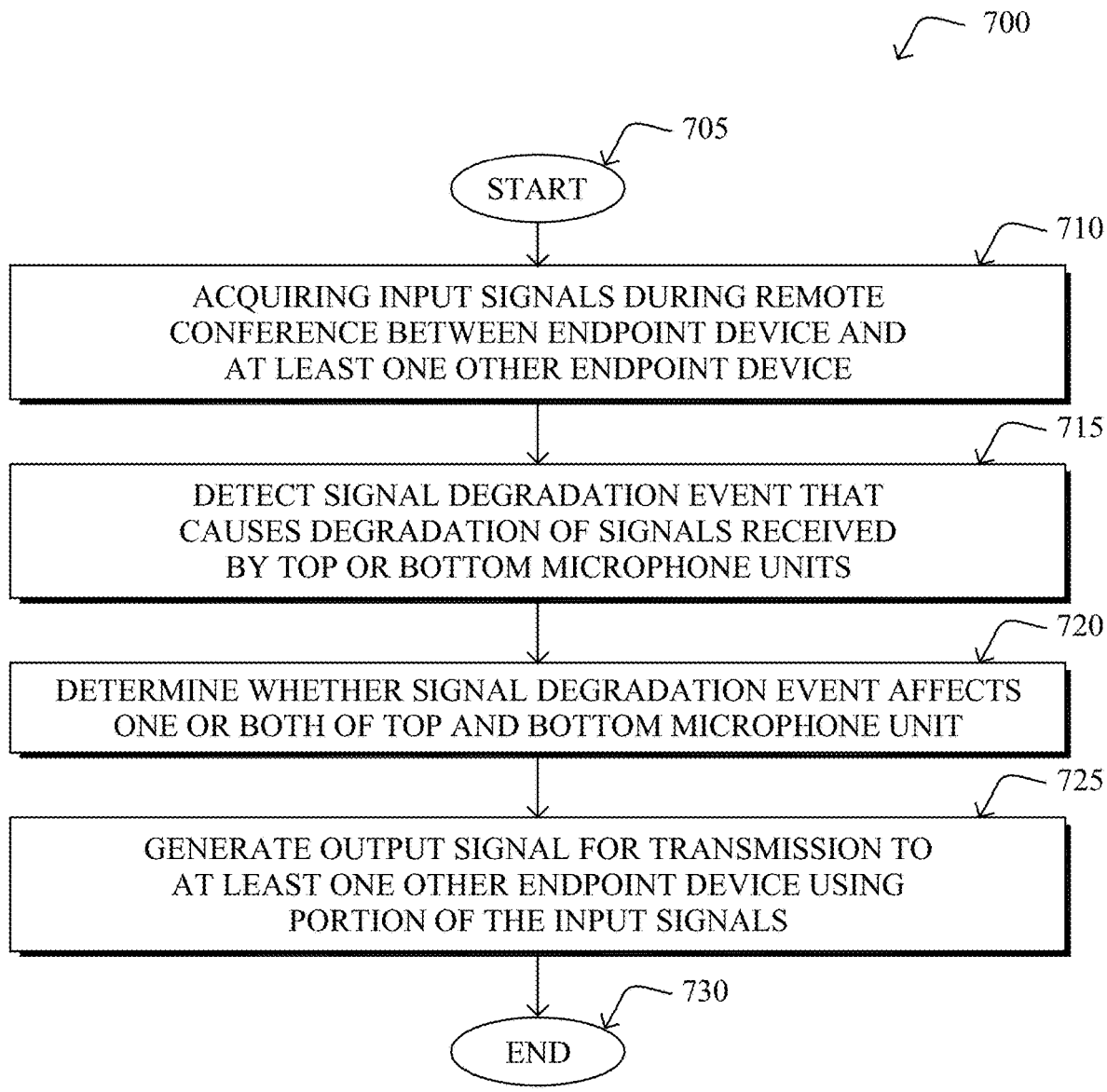
FIG. 7 illustrates an example simplified procedure for optimizing a multi-microphone system of an endpoint device.

FIG. 7 illustrates an example simplified procedure for optimizing a multi-microphone system of an endpoint device, in accordance with one or more embodiments described herein. For example, a non-generic, specifically configured device (e.g., device 200) in a network may perform procedure 700 by executing stored instructions (e.g., multi-microphone optimization process 248). The procedure 700 may start at step 705, and continues to step 710, where, as described in greater detail above, input signals are acquired for a remote conference between an endpoint device and at least one other endpoint device. The input signals may be received via a multi-microphone system of the endpoint device. The multi-microphone system may include at least a top microphone unit of the endpoint device and a bottom microphone unit of the endpoint device, as illustrated in FIG. 3, for example. According to some embodiments, the top microphone unit may be disposed at a top area of the endpoint device, while the bottom microphone unit may be disposed at a bottom area of the endpoint device. According to further embodiments, the endpoint device may further include a loudspeaker disposed at or near the bottom area proximate to the bottom microphone unit and a video display disposed between the bottom area of the bottom microphone unit and the top area of the top microphone unit. As a result, the top microphone unit may be positionally separated from the loudspeaker by the video display, such that the top microphone unit is further from the loudspeaker than the bottom microphone unit. According to yet further embodiments, the multi-microphone system may include a plurality of bottom microphone units including a bottom-left microphone unit disposed at a bottom-left area of the endpoint device and a bottom-right microphone unit disposed at a bottom-right area of the endpoint device. According to even further embodiments, the multi-microphone system may include a plurality of top microphone units configured to estimate the direction of arrival of the input signals.

At step 715, as detailed above, a signal degradation event that causes degradation of signals received by the top microphone unit or the bottom microphone unit may be detected. Numerous possible signal degradation events are described hereinabove for illustration. According to some embodiments, the signal degradation event may include a physical obstruction affecting any one or more of the bottom microphone units. According to other embodiments, the signal degradation event may include noise at any of the top and bottom microphone units. In such case, noise levels experienced at each microphone unit may be compared to determine which microphone unit is most and least affected by the noise. In further embodiments, spectral analysis or a machine learning-based model may be applied to the input signals to discern between noise and speech. In yet further embodiments, the signal degradation event may include a comb-filtering effect caused by a reflection of signals received by the top microphone unit. In even further embodiments, the signal degradation event may include audio being emitted from a loudspeaker of the endpoint device that interferes with the input signals received at any of the microphone units.

At step 720, as detailed above, information regarding the signal degradation event may be used to determine whether the signal degradation event affects one or both of the top microphone unit and the bottom microphone unit. Knowledge of the affected microphone unit(s) may inform the subsequent processing of the input signals in order to generate an optimized output signal to be transmitted to at least one other endpoint device. In some embodiments, noise levels at individual microphone units may be compared to a predefined threshold to determine whether noise is sufficiently disruptive to exclude a portion of the input signals from the output signal that is generated.

At step 725, as detailed above, the optimized output signal may be generated in response to determining that the signal degradation event affects one or both of the top microphone unit and the bottom microphone unit. The output signal may be generated using a portion of the input signals that excludes signals received by the top microphone unit and/or the bottom microphone unit determined to be affected by the signal degradation event. In other words, based on the signal degradation event and the specific microphone unit(s) impacted by the signal degradation event, the portion of received input signals used for generating the output signal may include input signals received by the unaffected, or less affected, microphone unit, while excluding input signals received by the more affected microphone unit, thereby preventing the inclusion of distortion, echo, and other harmful artifacts that would hinder the audio quality of the output signal and diminish the user experience of the conference.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for high-quality speech pickup by a conferencing endpoint device. Particularly, the described techniques enable broadband audio pickup and smooth frequency response, while avoiding shadowing effects from physical objects. Aspects of the present application also enhance the quality of double-talk (full-duplex communication) between two users, thus facilitating a more natural flow of conversation. Further aspects of the present application attenuate sound sources outside a specific sector, for instance, the camera field of view or the table surface.

While there have been shown and described illustrative embodiments that provide for optimization of a multi-microphone system of an endpoint device, it is to be understood that various other adaptations and modifications may be made within the spirit and scope of the embodiments herein. For example, while certain embodiments are described herein specifically with respect to top and bottom microphone units, other microphone units may also be used as desired. In addition, while a certain endpoint device is shown in the accompanying figures, the design in no way limits the scope of the present application, as other suitable endpoint designs may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or units described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   acquiring input signals for a remote conference between an endpoint device and at least one other endpoint device, the input signals being received via a multi-microphone system comprising at least a top microphone unit of the endpoint device and a bottom microphone unit of the endpoint device, wherein the bottom microphone unit comprises a bottom-left microphone unit and a bottom-right microphone unit;
   detecting a signal degradation event that causes degradation of signals received by the top microphone unit or the bottom microphone unit;
   determining, based on information regarding the signal degradation event, whether the signal degradation event affects one or both of the top microphone unit and the bottom microphone unit; and
   in response to determining that the signal degradation event affects either the bottom-left microphone unit or the bottom-right microphone unit, generating an output signal for transmission to the at least one other endpoint device using a portion of the input signals that excludes signals received by the bottom-left microphone unit or the bottom-right microphone unit determined to be affected by the signal degradation event,
   wherein the portion of the input signals used for generating the output signal includes signals received by the top microphone unit and signals received by the bottom-left microphone unit or the bottom-right microphone unit that is unaffected by the signal degradation event.

2. The method as in exclaim 1, further comprising:
   detecting a physical obstruction affecting one of the bottom-left microphone unit and the bottom-right microphone unit,
   wherein the portion of the input signals used for generating the output signal includes signals received by the bottom-left microphone unit or the bottom-right microphone unit that is unaffected by the physical obstruction and excludes signals received by the bottom-left microphone unit or the bottom-right microphone unit that is affected by the physical obstruction.

3. A The method as in claim 1, further comprising:
   detecting one or more physical obstructions affecting both of the bottom-left microphone unit and the bottom-right microphone unit,
   wherein the portion of the input signals used for generating the output signal includes low-frequency signals received by the bottom-left microphone unit or the bottom-right microphone unit and signals received by the top microphone unit and excludes high-frequency signals received by the bottom-left microphone unit and the bottom-right microphone unit.

4. The method as in claim 1, further comprising:
   detecting noise at the bottom-left microphone unit or the bottom-right microphone unit; and
   comparing a noise level at the bottom-left microphone unit with a noise level at the bottom-right microphone unit,
   wherein the portion of the input signals used for generating the output signal includes signals received by the bottom-left microphone unit or the bottom-right microphone unit that has a lower noise level and excludes signals received by the bottom-left microphone unit or the bottom-right microphone unit that has a higher noise level.

5. A The method as in claim 1, further comprising:
   determining a presence of a comb-filtering effect caused by a reflection of signals received by the top microphone unit,
   wherein the portion of the input signals used for generating the output signal includes signals received by the bottom microphone unit or signals of the top microphone unit determined to be less affected by the comb-filtering effect and excludes signals received by the top microphone unit.

6. A The method as in claim 1, further comprising:
   detecting audio being emitted from a loudspeaker of the endpoint device; and
   determining whether the top microphone unit or the bottom microphone unit is furthest from the loudspeaker,
   wherein the portion of the input signals used for generating the output signal includes signals received by the top microphone unit or the bottom microphone unit that is furthest from the loudspeaker and excludes signals received by the top microphone unit or the bottom microphone unit that is closest to the loudspeaker.

7. The method as in claim 1, further comprising:
   detecting noise at the top microphone unit or the bottom microphone unit; and
   applying spectral analysis or a machine learning-based model to the input signals to discern between the noise and speech present in the input signals.

8. The method as in claim 1, wherein:
   the top microphone unit is disposed at a top area of the endpoint device,
   the bottom microphone unit is disposed at a bottom area of the endpoint device,
   the endpoint device comprises a loudspeaker disposed at or near the bottom area and a video display disposed between the bottom area and the top area, and
   the top microphone unit is positionally separated from the loudspeaker by the video display.

9. The method as in claim 1, wherein the multi-microphone system comprises a plurality of top microphone units configured to estimate a direction of arrival of the input signals.

10. An apparatus, comprising:
    one or more network interfaces to communicate with a network;
    a processor coupled to the one or more network interfaces and configured to execute one or more processes; and
    a memory configured to store a process that is executable by the processor, the process when executed operable to:
    acquire input signals for a remote conference between an endpoint device and at least one other endpoint device, the input signals being received via a multi-microphone system comprising at least a top microphone unit of the endpoint device and a bottom microphone unit of the endpoint device, wherein the bottom microphone unit comprises a bottom-left microphone unit and a bottom-right microphone unit;

detect a signal degradation event that causes degradation of signals received by the top microphone unit or the bottom microphone unit;

determine, based on information regarding the signal degradation event, whether the signal degradation event affects one or both of the top microphone unit and the bottom microphone unit; and in response to determining that the signal degradation event affects either the bottom-left microphone unit or the bottom-right microphone unit, generate an output signal for transmission to the at least one other endpoint device using a portion of the input signals that excludes signals received by the bottom-left microphone unit or the bottom-right microphone unit degradation event, wherein the portion of the input signals used for generating the output signal includes signals received by the top microphone unit and signals received by the bottom-left microphone unit or the bottom-right microphone unit that is unaffected by the signal degradation event.

11. The apparatus as in claim 10, wherein the process when executed is further operable to:

detect a physical obstruction affecting one of the bottom-left microphone unit and the bottom-right microphone unit, wherein the portion of the input signals used for generating the output signal includes signals received by the bottom-left microphone unit or the bottom-right microphone unit that is unaffected by the physical obstruction and excludes signals received by the bottom-left microphone unit or the bottom-right microphone unit that is affected by the physical obstruction.

12. The apparatus as in claim 10, wherein the process when executed is further operable to:

detect one or more physical obstructions affecting both of the bottom-left microphone unit and the bottom-right microphone unit, wherein the portion of the input signals used for generating the output signal includes low-frequency signals received by the bottom-left microphone unit or the bottom-right microphone unit and signals received by the top microphone unit and excludes high-frequency signals received by the bottom-left microphone unit and the bottom-right microphone unit.

13. The apparatus as in claim 10, wherein the process when executed is further operable to:

detect noise at the bottom-left microphone unit or the bottom-right microphone unit; and compare a noise level at the bottom-left microphone unit with a noise level at the bottom-right microphone unit, wherein the portion of the input signals used for generating the output signal includes signals received by the bottom-left microphone unit or the bottom-right microphone unit that has a lower noise level and excludes signals received by the bottom-left microphone unit or the bottom-right microphone unit that has a higher noise level.

14. The apparatus as in claim 10, wherein the process when executed is further operable to:

determine a presence of a comb-filtering effect caused by a reflection of signals received by the top microphone unit, wherein the portion of the input signals used for generating the output signal includes signals received by the bottom microphone unit or signals of the top microphone unit determined to be less affected by the comb-filtering effect and excludes signals received by the top microphone unit.

15. The apparatus as in claim 10, wherein the process when executed is further operable to:

detect audio being emitted from a loudspeaker of the endpoint device; and determine whether the top microphone unit or the bottom microphone unit is furthest from the loudspeaker, wherein the portion of the input signals used for generating the output signal includes signals received by the top microphone unit or the bottom microphone unit that is furthest from the loudspeaker and excludes signals received by the top microphone unit or the bottom microphone unit that is closest to the loudspeaker.

16. The apparatus as in claim 10, wherein the process when executed is further operable to:

detect noise at the top microphone unit or the bottom microphone unit; and apply spectral analysis or a machine learning-based model to the input signals to discern between the noise and speech present in the input signals.

17. The apparatus as in claim 10, wherein:

the top microphone unit is disposed at a top area of the endpoint device, the bottom microphone unit is disposed at a bottom area of the endpoint device, the endpoint device comprises a loudspeaker disposed at or near the bottom area and a video display disposed between the bottom area and the top area, and the top microphone unit is positionally separated from the loudspeaker by the video display.

18. A tangible, non-transitory, computer-readable medium that stores program instructions causing a device in a network to perform a process comprising:

acquiring input signals for a remote conference between an endpoint device and at least one other endpoint device, the input signals being received via a multi-microphone system comprising at least a top microphone unit of the endpoint device and a bottom microphone unit of the endpoint device, wherein the bottom microphone unit comprises a bottom-left microphone unit and a bottom-right microphone unit;

detecting a signal degradation event that causes degradation of signals received by the top microphone unit or the bottom microphone unit;

determining, based on information regarding the signal degradation event, whether the signal degradation event affects one or both of the top microphone unit and the bottom microphone unit; and in response to determining that the signal degradation event affects either the bottom-left microphone unit or the bottom-right microphone unit, generating an output signal for transmission to the at least one other endpoint device using a portion of the input signals that excludes signals received by the bottom-left microphone unit or the bottom-right microphone unit determined to be affected by the signal degradation event, wherein the portion of the input signals used for generating the output signal includes signals received by the top microphone unit and signals received by the bottom-left microphone unit or the bottom-right microphone unit that is unaffected by the signal degradation event.

* * * * *

UNITED STATES PATENT AND TRADEMARK OFFICE
CERTIFICATE OF CORRECTION

PATENT NO. : 11,671,753 B2
APPLICATION NO. : 17/459876
DATED : June 6, 2023
INVENTOR(S) : Johan Ludvig Nielsen et al.

It is certified that error appears in the above-identified patent and that said Letters Patent is hereby corrected as shown below:

In the Claims

Column 19, Line 46, please amend as shown:
2. The method as in claim 1, further comprising:

Column 19, Line 57, please amend as shown:
3. The method as in claim 1, further comprising:

Column 20, Line 14, please amend as shown:
5. The method as in claim 1, further comprising:

Column 20, Line 24, please amend as shown:
6. The method as in claim 1, further comprising:

Column 21, Line 21, please amend as shown:
unit determined to be affected by the signal degradation event, Signed and Sealed this
Fifth Day of September, 2023

Katherine Kelly Vidal
*Director of the United States Patent and Trademark Office*